(No Model.)

I. M. LEVY.
COMBINED ASH PAN AND SIEVE.

No. 507,624. Patented Oct. 31, 1893.

Witnesses:

Inventor:
Isaac M. Levy
By Lotz & Kennedy
Attorneys.

UNITED STATES PATENT OFFICE.

ISAAC M. LEVY, OF CHICAGO, ILLINOIS, ASSIGNOR OF ONE-THIRD TO FERDINAND MINZESHEIMER, OF SAME PLACE.

COMBINED ASH PAN AND SIEVE.

SPECIFICATION forming part of Letters Patent No. 507,624, dated October 31, 1893.

Application filed May 2, 1893. Serial No. 472,804. (No model.)

*To all whom it may concern:*

Be it known that I, ISAAC M. LEVY, a citizen of the United States, residing at Chicago, in the county of Cook and State of Illinois, have invented certain new and useful Improvements in a Combined Ash Pan and Sieve; and I do hereby declare the following to be a full, clear, and exact description of the invention, such as will enable others skilled in the art to which it appertains to make and use the same.

This invention relates to a novel construction in an ash-pan for stoves and the like, the object being to provide an ash-pan, by means of which the ashes can be effectually sifted without emptying them from such pan.

The invention consists in the features of construction and combinations of parts hereinafter fully described and specifically claimed.

Figure 1:
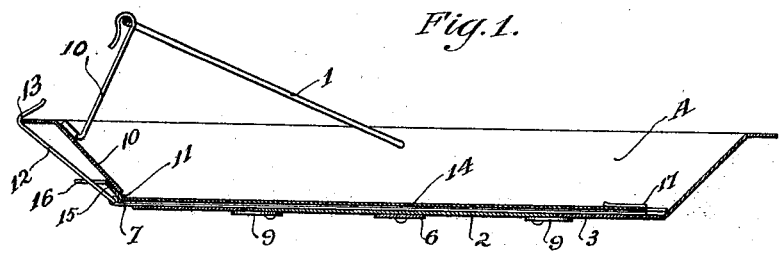
Figure 2:
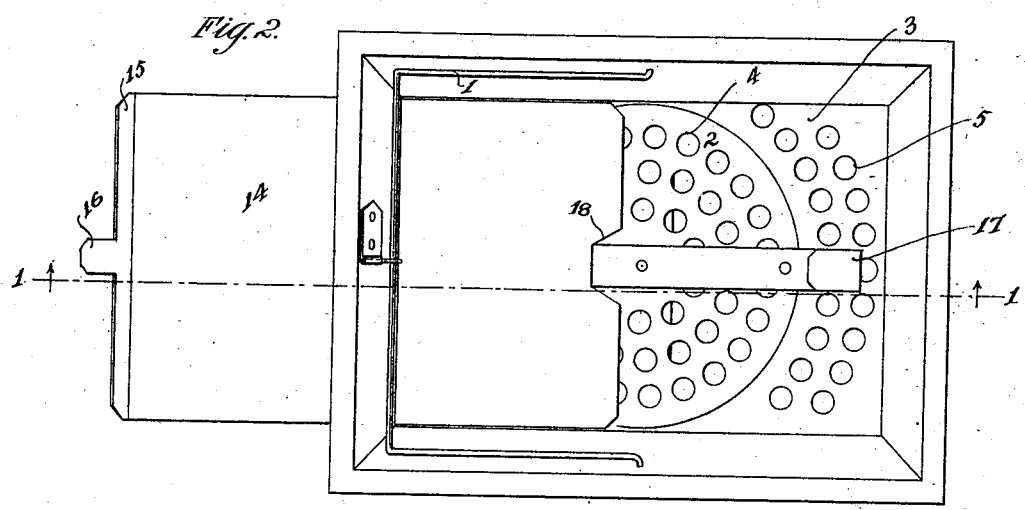
Figure 3:
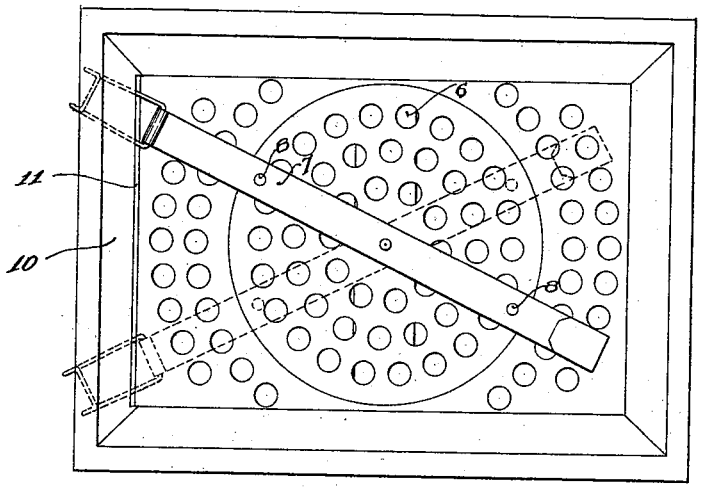

In the accompanying drawings illustrating my invention,—Figure 1 is a longitudinal section of an ash-pan constructed in accordance with my invention, taken on the line 1—1 of Fig. 2. Fig. 2 is a top plan view with a removable false bottom of the pan partially removed. Fig. 3 is a top plan view with such false bottom entirely removed.

Referring now to said drawings, A indicates an ash-pan which in its general features is the same as the pans commonly used, and is adapted to be inserted into the ash pit of a stove, and beneath the grate, to receive the ashes that are shaken therethrough. Said pan A is provided with a swinging bail or handle 1, in the usual manner.

In accordance with the principle involved by my invention, I make a section 2 of the bottom 3 of the pan, movable with relation to such bottom 3, and further provide perforations 4 in said movable section 2 and perforations 5 in the bottom 3. In constructing said movable section 2 I prefer to make a circular opening in the bottom 3 and make said movable section 2 circular to fit snugly within said circular opening, and then to pivot such section 2 concentrically upon a strap 6 secured to the bottom of the pan at each side of the same and extending across and below such opening. For the purpose of turning such section 2 upon its pivot, and guiding the same, I fasten upon the upper face of said section a bar 7 that extends radially across the same and moves flat upon said section 2, so that beyond the periphery of said section 2 the bar 7 lies flat against the upper face of the bottom 3 of the pan. The rivets or bolts 8 that are employed to secure the bar 7 to the section 2, near the periphery of the same, pass through said section 2 and carry at their lower ends guide plates 9 that overlap the bottom 3 of the pan, as clearly shown in Fig. 1. In this way it will be noted that the movable section 2 can be turned on its pivot by vibrating the bar 7, and that said bar 7, together with the guide plates 9 serve to hold the movable section 2 in position. The end 10 of the pan is slotted, as shown at 11, at the line of juncture with the bottom 3, and through this slot 11 the end of the bar 7 passes when the bar is parallel with the sides of the pan, as shown in Fig. 1. To the outer end of the bar 7 a pivoted handle or hook 12 is secured, by means of which the said bar can be vibrated, as illustrated in Fig. 3, while the end of said handle 12 is hooked as shown at 13. Said hooked portion of the handle 12 is so arranged that when the bar stands parallel with the sides of the pan said hook can be sprung over the upper edge of the adjacent end of the pan, for the purpose of holding the bar 7 from vibrating. I provide a false bottom 14 for said pan, that is adapted to be inserted at such times as the pan is not being used as a sifter. The said false bottom fits the lower end of the pan and is adapted to be inserted through the slot 11 in the end thereof. The outer end of the false bottom 14 is bent upwardly, as at 15, to encounter the end piece 10 of the pan, and a hand-piece 16 projects from said bent portion 15 by which to insert and remove the said false bottom. The other end of said false bottom 14 is adapted to enter the hooked end 17 of the bar 7, and the said false bottom is cut out as at 18 to permit the same to be pushed to the end of the pan, as shown in Fig. 1, while the said hook 17 of the bar 7 serves to hold the false bottom 14 in place upon the bottom 3 of the pan.

In operation said pan is used as follows: When the device is inserted within the ash pit of the stove, to receive the ashes, the false bottom is inserted and the pivoted handle 12 of the vibrating bar 7 is hooked upon the edge of the pan, as shown in Fig. 1. In this position the pan will act as an ordinary ash-pan. When, however, it is filled with ashes and it is desired to sift the same, the bail 1 is first lifted, as shown in Fig. 1, and hooked by a pivoted hook 19 fastened to the pan so that the other end of the pan can be rested upon the edge of a box, or the like, and the pan suspended by supporting the cross-piece of said bail 1. The hooked handle 12 is then unhooked and the false bottom withdrawn. Then, by means of the handle 12 the bar and, consequently, the movable section 2 of the bottom can be vibrated or shaken, and this will obviously sift the ashes through the perforations in the bottom of the pan, in a familiar manner. An important feature of the invention is, that the usual objectionable cloud of dust arising is avoided, as the agitation of the ashes occurs at the bottom of the heap, so that the top of the ash heap is undisturbed and gradually passes downwardly through the coals that may not pass through the perforations in the bottom of the pan. It is found preferable to place the false bottom on the top of the ashes in the pan and thus confine any dust that may accidentally be raised. By the use of a pan of this construction I also avoid pouring the ashes from the ash-pan to an ash sifter, as commonly done, and therefore avoid the dust that would be raised by such an operation.

It will be understood, of course, that various mechanical changes can be made without departing from my invention. Except in the claims for the specific construction I do not wish to be limited to the exact construction herein shown.

I claim as my invention—

1. An ash-pan having a perforated circular section 2 located within a circular opening in the bottom of the pan and pivoted concentrically upon a strap secured to said pan, guides for retaining said section 2, a bar 7 secured to said section 2 and by means of which said section can be turned on its pivot, substantially as described.

2. An ash-pan having a slot 11 at one end thereof, a movable perforated section 2 located within an opening in the bottom of the pan, and having a bar 7 extending through said slot in the end of the pan and by means of which said section can be vibrated, a pivoted, hooked handle 12 secured to said bar, a false bottom 14 to be inserted in said slot and to be engaged by hooked end 17 of said bar 7, substantially as described.

In testimony whereof I affix my signature in presence of two witnesses.

ISAAC M. LEVY.

Witnesses:
HARRY COBB KENNEDY,
RUDOLPH W. LOTZ.